Fig. 4.

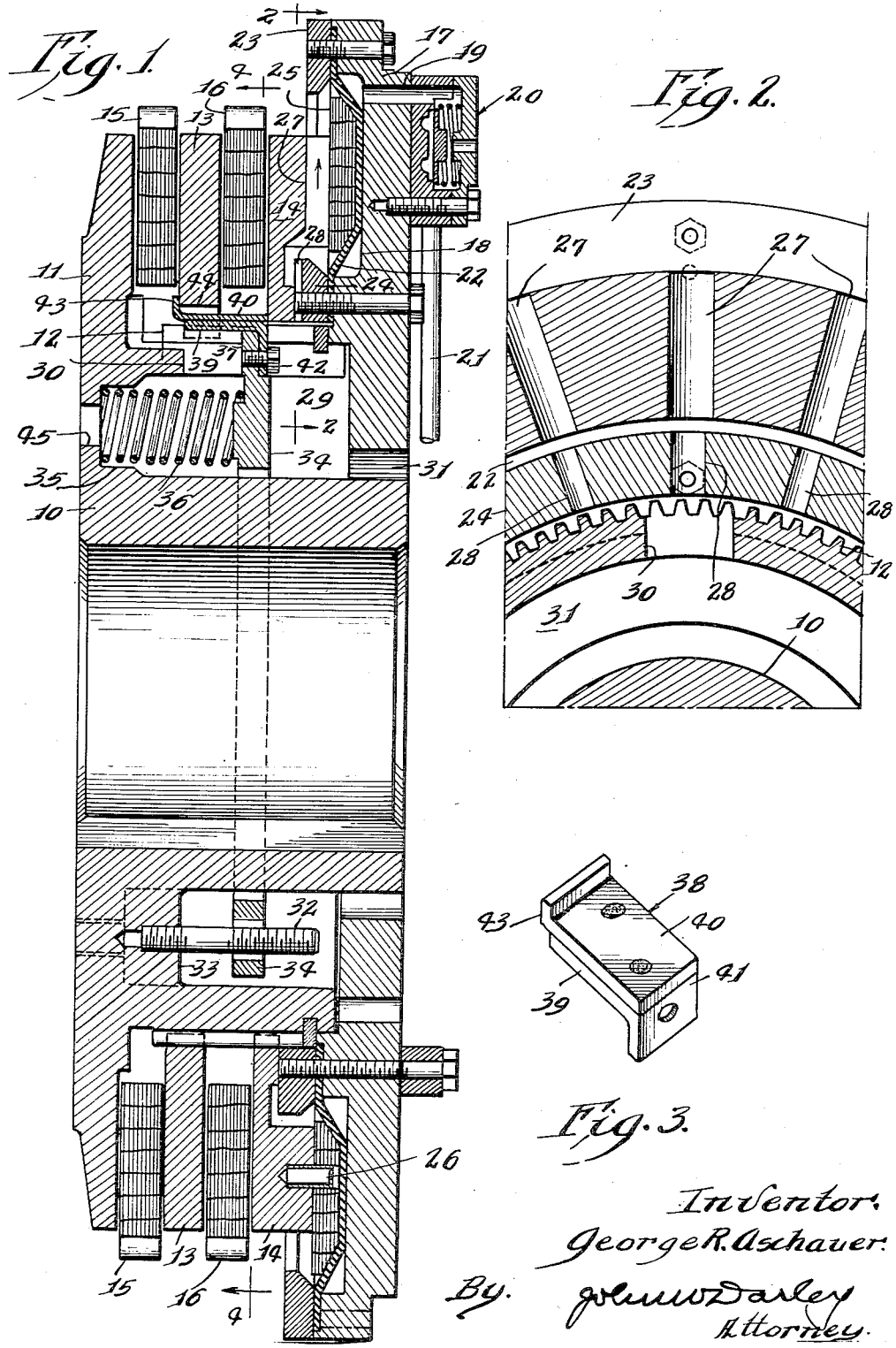

Inventor:
George R. Aschauer.
By
Attorney.

March 18, 1958  G. R. ASCHAUER  2,827,142
MULTIPLE DISC CLUTCH WITH RELEASING AND COOLING MEANS
Filed March 16, 1954  4 Sheets-Sheet 4
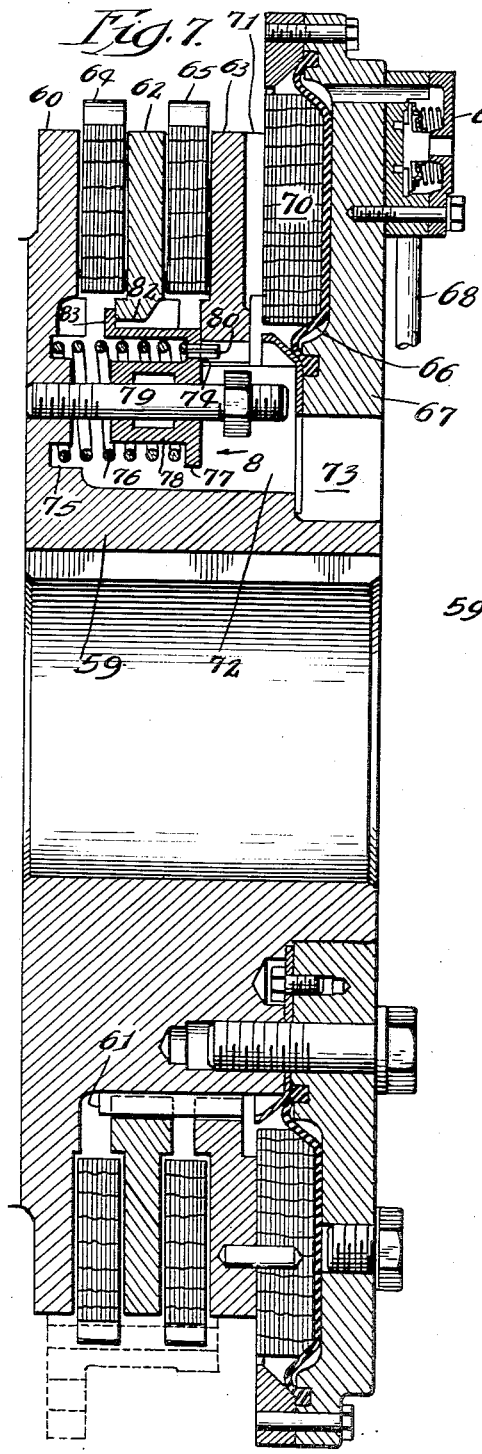
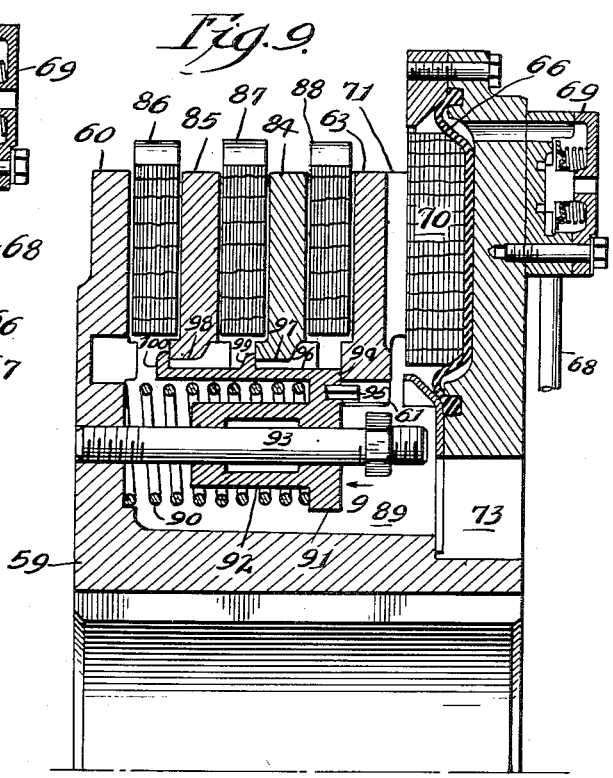
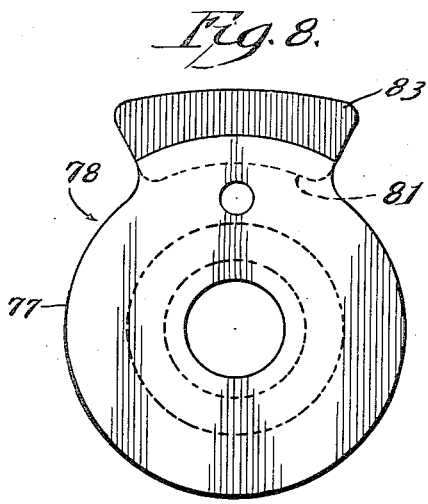
Inventor.
George R. Aschauer.
By John W. Darley
Attorney.

United States Patent Office 2,827,142
Patented Mar. 18, 1958

2,827,142
MULTIPLE DISC CLUTCH WITH RELEASING AND COOLING MEANS

George R. Aschauer, Racine, Wis., assignor to Twin Disc Clutch Company, Racine, Wis., a corporation of Wisconsin Application March 16, 1954, Serial No. 416,491

7 Claims. (Cl. 192—69)

My invention relates to friction clutches and is concerned more particularly with certain improvements in the release and plate separation mechanism and in the cooling of parts of the clutch.

An important factor in the operation of multidisc clutches is the ability of the friction plates to fully separate when the clutch is released. In the common type of fluid actuated clutch, the plates are intended to be released by springs whose opposite ends respectively bear against back and pressure plates, the latter being the plate through which the actuating pressure is applied to the remaining plates. Actually, such springs merely further separate the back and pressure plates when the clutch is released and it is expected that the intervening friction plates will separate themselves. If sufficient time is available, the latter plates will separate but at the expense of considerable drag and undue wear. This action is particularly objectionable in clutches which are associated with machines designed for short, repetitive working cycles, and having capacity for rapid acceleration and deceleration or quick reversals. Further, such springs are located in the zone of highest temperature so that they quickly lose their temper and effectiveness.

It is therefore one object of my invention to provide a clutch in which the release springs are located relatively remote from the faces of the friction plates in a cooling air stream induced by the rotation of the clutch and yet have positive separating connection with the floating plates thereof.

A further object is to provide a clutch of the character indicated in which the release springs are positively connected to each of the floating plates to thereby insure definite separating movements thereof when the clutch actuating pressure is relieved.

A further object is to devise a clutch as above set forth in which the extending force of the release springs is transferred to the plate separating elements through a ring common to all of the elements and springs and which ring may be clamped in position to permit disassembly of the clutch.

A further object is to provide an air actuated clutch constructed and arranged as above in which provision is made for dissipating the heat adjacent the air cylinder to prevent temperature rise of the air therein.

These and further objects of the invention will be set forth in the following specification, reference being had to the accompanying drawings, and the novel means by which said objects are effectuated will be definitely pointed out in the claims.

In the drawings:

Fig. 1 is a sectional elevation of a two plate clutch shown in released position and incorporating the novel features of one form of the invention.

Fig. 2 is a fragmentary section along the line 2—2 in Fig. 1.

Fig. 3 is an isometric view of one of the plate separators in Fig. 1.

Fig. 4 is a section along the line 4—4 in Fig. 1.

Fig. 7 is a sectional elevation of a two plate clutch in release position showing a modified releasing arrangement for the floating plates.

Fig. 8 is an enlarged end view of the clutch plate separator looking in the direction of the arrow 8 in Fig. 7.

Fig. 9 is a fragmentary, sectional view of a three plate clutch in release position incorporating a release mechanism generally similar to that illustrated in Fig. 7.

Figure 5:
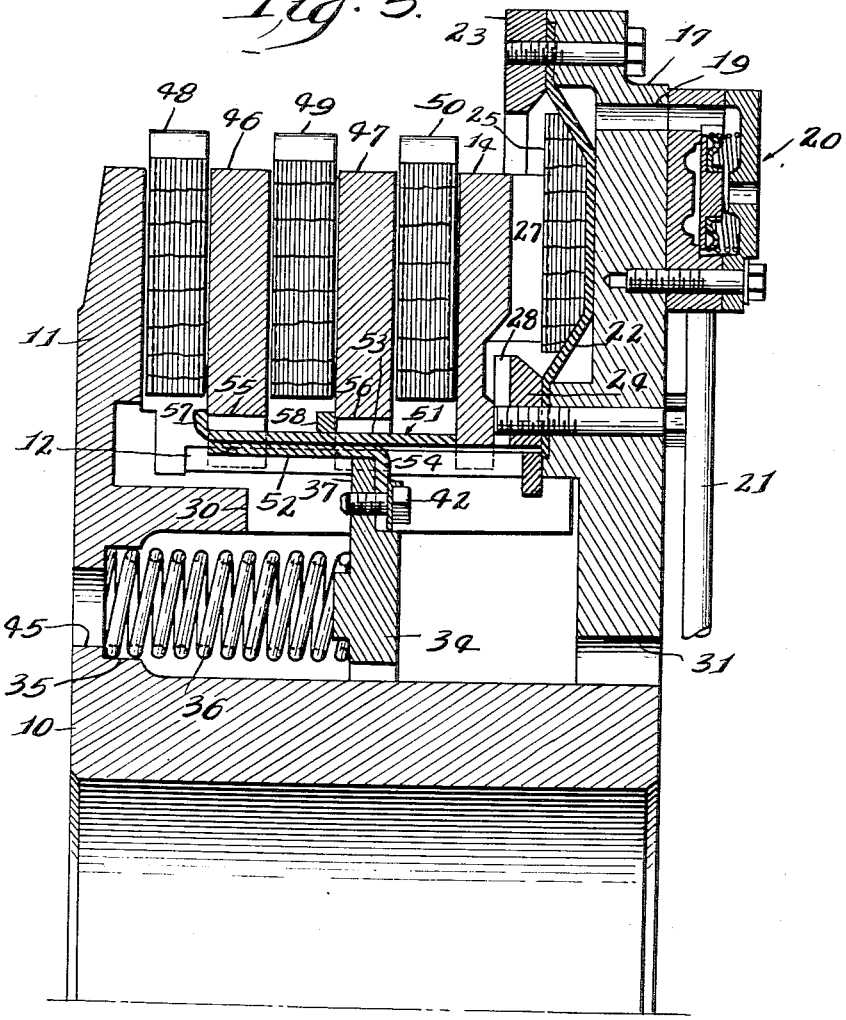
Fig. 5 is a fragmentary, sectional view, similar to Fig. 1, but showing the features thereof applied to a three plate clutch, also illustrated in released position.

This application is a continuation-in-part of my copending application for Multiple Disc Clutch With Releasing and Cooling Means, Ser. No. 322,493, filed November 25, 1952, now abandoned.

Referring to Fig. 1 of the drawings, the numeral 10 designates the clutch hub which is appropriately bored to receive a driving shaft (not shown), although the direction of drive through the clutch may be reversed in this form or in either of the other modifications subsequently described. Integrally formed with the hub 10 at one end thereof is an annular flange constituting a back plate 11.

The periphery of the hub 10 is toothed at 12 for driving and relative sliding engagement with spaced, floating plates 13 and 14 and between the back plate 11 and the floating plate 13, and the floating plates 13 and 14, are respectively located driven plates 15 and 16 which may be externally toothed for connection with a load.

The several plates are engaged to establish drive through the clutch by means of an air actuated device including an annular plate 17 that is appropriately carried by the hub 10 and is recessed on the clutch plate side to form an annular cylinder 18 that serially communicates through a passage 19 in the plate 17 and a quick release valve generally indicated by the numeral 20 with an air supply duct 21. The valve 20 is of conventional type, forms no part of the invention, and any desired number may be employed.

The open end of the cylinder 18 is closed by an annular, elastic diaphragm 22 whose outer and inner portions are respectively clamped to the plate 17 by rings 23 and 24. Between the diaphragm 22 and the adjacent side of the floating plate 14 and snugly fitting therebetween axially of the clutch is an insulation ring 25 which is carried on the plate 14 by a plurality of pins 26. Preferably, the face of the plate 14 which abuts the ring 25 is recessed to provide a plurality of air channels 27 (see Figs. 1 and 2) whose outer ends communicate with the atmosphere and whose inner ends communicate with the outer ends of similarly related channels 28 provided in that face of the ring 24 which abuts the floating plate 14.

As clearly shown in Fig. 1, the hub 10 is cored radially inward of the toothed portion 12 thereof to provide an annular chamber 29 which is coaxial with the clutch and communicates through a plurality of equispaced, radial slots 30 cut in the toothed portion 12 with the inner ends of the channels 28 and through an annular passage 31 between the hub 10 and the inner peripheral face of the plate 17 with the atmosphere. Therefore, as the clutch rotates when engaged and released, air induced by this motion flows serially through the passage 31, chamber 29, slots 30 and channels 28 and 27 to cool the floating plate 14 and thus prevent an undesirable temperature rise of the actuating air in the cylinder 18.

A plurality of studs 32 are mounted in the annular base 33 of the chamber 29 in equispaced relation around the hub and freely piloted on the studs is a ring 34. Each stud 32 extends beyond or to the right of the ring 34 for a purpose presently explained. The chamber base 33 is recessed to provide a plurality of pockets 35, also equispaced around the hub, and seated in each pocket is one end of a release spring 36 whose opposite end bears constantly against the ring 34 which is arranged for free movement in the chamber 29 axially of the clutch.

Figure 4:
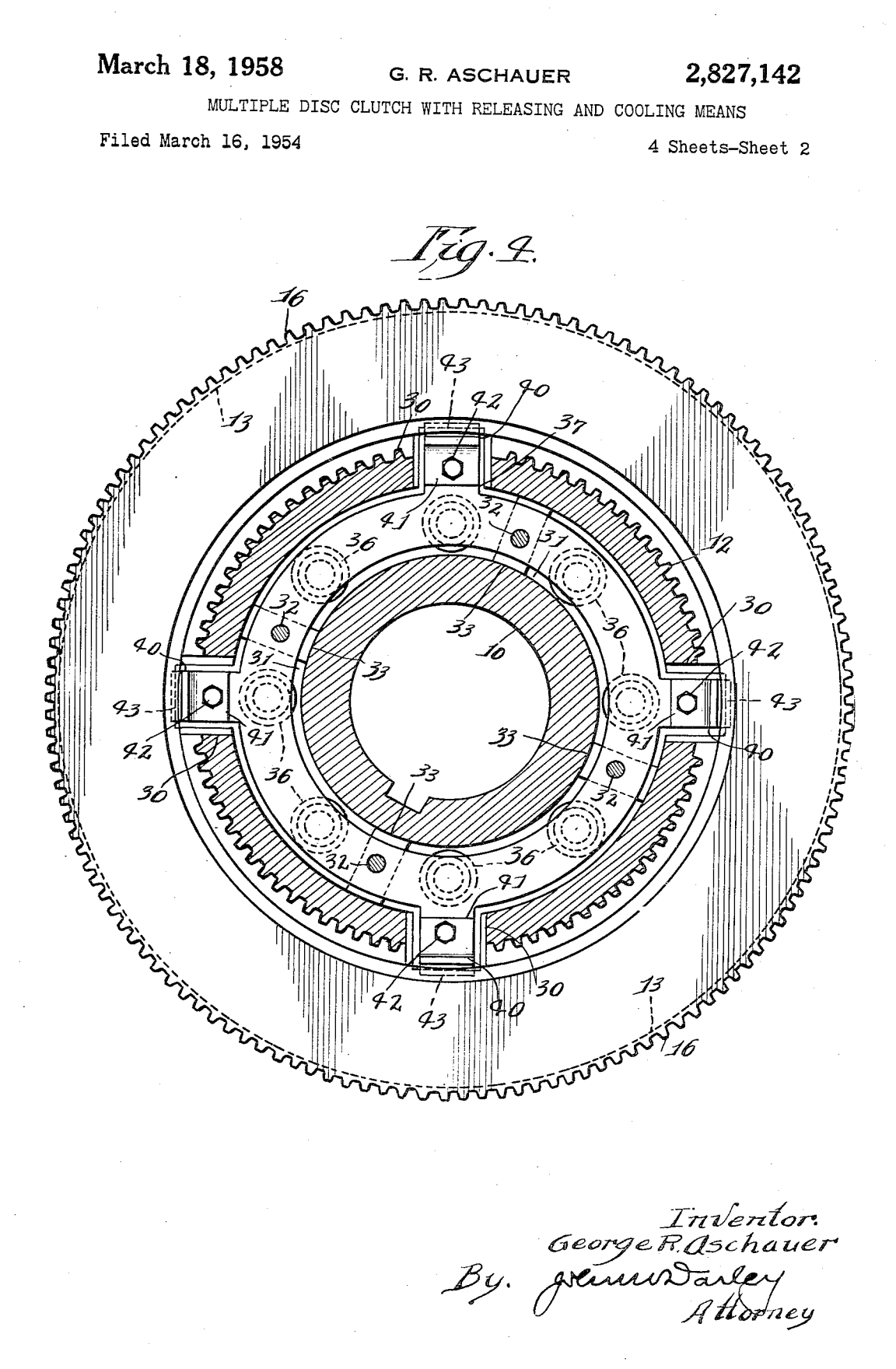

The ring 34 is provided with a plurality of equispaced fingers 37, four such being shown in Fig. 4, each of which extends radially outward through and is freely movable in an associated slot 30. Connected to each finger 37 is a plate separator generally indicated by the numeral 38 and illustrated in detail in Figs. 1 and 3. Each separator includes flat, metal strips 39 and 40 which are spot welded in abutting relation over their major surfaces, with the strip 39 having an ear 41 bent normal thereto and extending radially inward of the hub 10 for attachment to the associated finger 37 by a cap screw 42 and with the strip 40 including a similar ear 43 bent normal thereto and extending radially outward of the hub 10.

In Fig. 1, the position of each separator 38 is such that, under the impulse of the springs 36, it simultaneously engages the floating plates 13 and 14 in their released positions. Specifically, the right end of the strip 40 bears against the floating plate 14 while the opposite end extends through a slot 44 formed in the inner periphery of the floating plate 13 with the ear 43 bearing against the latter plate.

To engage the clutch, air pressure is established in the cylinder 18 in the usual manner to thereby flex the diaphragm 22 and effect a frictional engagement of the plates 13, 14, 15 and 16 against the back plate 11. This engaging action also compresses the springs 36 due to the engagement of the floating plate 14 with the adjacent ends of the separators 38, but the ears 43 are moved clear of the floating plate 13 since the floating plate 14 is shifted a distance sufficient to take up the clearances between the floating, driven and back plates. This relationship insures a full engagement of the floating plate 13.

When the air pressure is cut off, the springs 36 are free to return the ring 34 to the position shown in Fig. 1. This action not only releases the clutch but insures a positive and simultaneous separation of the floating plates 13 and 14 from the driven plates 15 and 16, thereby eliminating drag.

A further advantage of the separators 38 is that they enable the springs to be located remote from the heat generating faces of the plates so that the springs are characterized by greater longevity. Further, it is possible to cool the springs 36 since the base of each spring pocket 35 communicates with the atmosphere through a passage 45 which in turn connects with the chamber 29. The springs are therefore cooled by the air stream moving through the chamber 29 and outwardly through the channels 27 and 28.

The pilot mounting of the ring 34 on the studs 32 permits a partial disassembly of the clutch, such as for plate replacement, without disturbing the springs. To accomplish this result, it is merely necessary to thread a nut (not shown) on that part of each stud 32 that extends beyond the ring 34 so that this part and all of the springs remain in position pending the repair.

Figure 6:
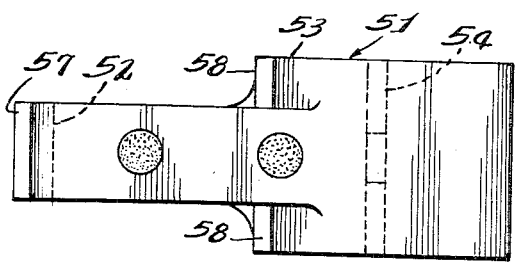
Fig. 6 is a plan view of the plate separator shown in Fig. 5.

In Figs. 5 and 6 is illustrated a modification showing the application of the plate separators of the general type shown in Fig. 1 to a three plate clutch. Functionally identical parts in Figs. 1 and 5 are denoted by the same numerals.

In addition to the end floating plate 14, the Fig. 5 form includes intermediate floating plates 46 and 47, also having toothed engagement with the hub 10 and with the three floating plates operably related to a like number of driven plates 48, 49 and 50.

Each separator 51 includes flat metal strips 52 and 53 which are spot welded in abutting relation over their major surfaces, with the strip 52 having an ear 54 bent normal thereto and extending radially inward of the hub 10 for attachment to the associated finger 37 by a cap screw 42. The strip 53 extends through slots 55 and 56 provided, respectively, in the inner peripheries of the intermediate floating plates 46 and 47, and the right end of the strip 53 constantly bears in a releasing direction against the end floating plate 14 while the opposite end includes a radially outward ear 57 that constantly bears in the same direction against the floating plate 46 when the clutch is released. Intermediate the ends of the strip 53, a pair of radially outward ears 58 are cut from opposite sides of the strip for releasing contact with the floating plate 47. As shown in Fig. 6, the strips 52 and 53 are narrow at one end and wider at their opposite ends, the narrow and wider ends respectively abutting and with the ears 57 and 58 respectively bent from the indicated portions of the strip 53.

The operation of the Fig. 5 modification is identical with that shown in Fig. 1, except that provision is made for releasing a three plate clutch and simultaneously separating the floating plates thereof. When the clutch is engaged, the ears 57 and 58 are shifted clear of the floating plates 46 and 47, respectively, to permit their full frictional engagement for reasons noted in connection with the Fig. 1 clutch. The cooling features are identical with Fig. 1 and are accomplished in the same manner.

The modification shown in Fig. 7 differs essentially from those described above in the rearrangement and simplification of the plate releasing mechanism. As in Fig. 1, the hub 59 includes an integral, annular flange at one end which forms a back plate 60 and is otherwise peripherally toothed at 61 for driving and relative sliding engagement with spaced, floating plates 62 and 63. A driven plate 64 is located between the plates 60 and 62 and a similar driven plate 65 is positioned between the plates 62 and 63, the plates 64 and 65 being externally toothed for connection with a load.

The above plates are engaged by means generally similar to that shown in Fig. 1 except for a different style of annular, elastic diaphragm 66 whose details form no part of the present invention. The peripheries of this diaphragm are suitably secured to an annular plate 67 chambered on the diaphragm side thereof and appropriately attached to the hub 59. Air pressure is supplied to the space between the diaphragm 66 and plate 67 through a pipe 68 and a quick release valve 69 similar to the valve 20 and of which any desired number may be used. Engaging movement of the diaphragm 66 is transmitted through an insulation ring 70 to the floating plate 63 and the latter preferably includes a plurality of radial air channels 71 in that face which abuts the ring 70. These channels serve the same purpose as the channels 27 and their inner ends connect with a series of circumferentially spaced pockets 72, four being a convenient number, provided in the hub 59 and which in turn communicate through an equal number of passages 73 in the plate 67 with the atmosphere. A part of the toothed periphery 61 is slotted at 74 to the left of the plate 63 for a purpose presently explained.

The distinguishing features of this modification compared to Fig. 1 is a reduction in the number of pockets in the clutch hub, the elimination of the ring 34, and direct association of a release spring with its companion separator.

That part of the back plate 60 which forms the radial base of the pocket 72 is annularly recessed at 75 to act as a seat for one end of a helical release spring 76 whose opposite end bears against an annular flange 77 provided on a separator 78 which is axially slidable on a stud 79 mounted in the back plate 60. In the released position shown, the flange 77 extends through the slot 74 and abuts the floating plate 63, and the separator 78 is prevented from rotating relative to the stud 79 by means of a pin 80 carried by the flange 77 and extending between a pair of adjacent teeth in the periphery 61.

The separator 78 additionally includes a particircular web 81 (see Figs. 7 and 8) lying radially outward of the spring 76 and integrally formed with the flange 77. The web extends axially from the latter flange through a slot 82 provided in the inner periphery of the floating plate 62 and terminates in a radially outward ear 83 which, in the released position shown, engages the floating plate 62. As in Fig. 1, these springs are remote from the heat generating zone of the clutch and are cooled by air flowing through the pockets 72 when the clutch is engaged. The releasing action of the separators 78 is identical with that of the separators 38, but in Fig. 7, each separator is acted upon by its own spring directly with assurance that each spring will exert its full release force at all times free of any possible restraint by an intervening member.

The modification shown in Fig. 9 shows the application of the general type of releasing mechanism illustrated in Fig. 7 to a three plate clutch. Functionally identical parts in Figs. 7 and 9 are denoted by the same numerals.

In addition to the end floating plate 63, the Fig. 9 form includes intermediate floating plates 84 and 85, also having toothed engagement with theh ub 10 and the three floating plates are operably related to a like number of driven plates 86, 87 and 88.

The hub 59 includes a plurality of circumferentially spaced pockets 89, similar to the pockets 72, which provide communication between the passsages 73 and 71 for cooling. A helical release spring 90 is located in each pocket 89 and with one end seated against the back plate 60 and the other end abutting an annular flange 91 provided on a separator 92 that is slidable on a stud 93 carried by the plate 60, the movements of the separator being only axially of the clutch. In the released position shown, the flange 91 extends radially through a slot 94 in the toothed periphery 61 and abuts the floating plate 63, and is held against rotation relative to the stud 93 by a pin 95 carried by the flange and extending between a pair of adjacent teeth in the periphery 61.

As viewed in the direction of the arrow 9 in Fig. 9, the separator 92 appears like the separator 78 in Fig. 8, but differs therefrom in side elevation due to the greater number of floating plates. It also includes a particular web 96 lying radially outward of the spring 90 and extending axially from the flange 91 through slots 97 and 98 in the inner peripheries of the floating plates 84 and 85, respectively. Radial ears 99 and 100 extend outward from the web 96 for engagement with the floating plates 84 and 85, respectively, in the released position of the clutch.

The operation of this releasing mechanism and its advantages, as well as the cooling action on the springs, are identical with the Fig. 7 form. In the Figs. 7 and 9 modifications, as many releasing mechanisms may be used as desired, but for the design four is considered a convenient number.

I claim:

1. A friction clutch comprising a hub having a back plate at one end thereof, a plurality of floating plates having toothed engagement with the hub, a plurality of coacting plates alternately related to the back and floating plates, actuating means for engaging the plates, and means for releasing the clutch and providing separation of the floating plates including a plurality of studs circumferentially spaced around and having one end of each mounted in the back plate end of the hub, rigid separator means slidable on the studs in axial directions only and being common to all of the floating plates, and spring means for shifting the separator means to release position when the actuating means is in non-engaging position.

2. A friction clutch comprising a hub having a back plate at one end thereof, a plurality of floating plates having toothed engagement with the hub, a plurality of coacting plates alternately related to the back and floating plates, actuating means for engaging the plates, and means for releasing the clutch and providing separation of the floating plates including a plurality of studs circumferentially spaced around and having one end of each mounted in the back plate end of the hub, a rigid separator slidable only axially on each stud and being common to all of the floating plates, and a helical spring encircling each stud and interposed between the back plate and the associated separator for shifting the latter to release position when the actuating means is in non-engaging position.

3. A friction clutch comprising a hub having a back plate at one end thereof, a plurality of floating plates having toothed engagement with the hub, a plurality of coacting plates alternately related to the back and floating plates, actuating means for engaging the plates, and means for releasing the clutch and providing separation of the floating plates including a plurality of studs circumferentially spaced around and having one end of each mounted in the back plate end of the hub, a rigid separator slidable only axially on each stud and being positioned generally inwardly of and having portions releasably engageable with the floating plates, and a helical spring encircling each stud and interposed between the back plate and the associated separator for shifting the latter to release position when the actuating means is in non-engaging position.

4. A friction clutch comprising a hub having a back plate at one end thereof, a plurality of floating plates having toothed engagement with the hub, a plurality of coacting plates alternately related to the back and floating plates, actuating means for engaging the plates, and means for releasing the clutch and providing separation of the floating plates including a plurality of studs circumferentially spaced around and having one end of each mounted in the back plate hub, a rigid separator slidable only axially on each stud and being common to all of the floating plates, means for preventing rotation of each separator relative to its adjacent stud, and a helical spring encircling each stud and interposed between the back plate and the associated separator for shifting the latter to release position when the actuating means is in non-engaging position.

5. A friction clutch comprising a hub having a back plate at one end thereof and a plurality of pockets circumferentially spaced around and communicating through an end of the hub with the atmosphere, an end and an intermediate floating plate having toothed engagement with the hub, a plurality of coacting plates alternately related to the back, intermediate and end plates, actuating means for engaging the plates, the face of the end plate opposite the actuating means including a plurality of radial channels whose opposite ends communicate respectively with the atmosphere and the pockets, and means for releasing the clutch and providing separation of the floating plates including a stud located in each pocket parallel to the axis of the clutch and having one end mounted in the back plate, rigid separator means slidable on each stud in axial directions and being common to all of the floating plates, and spring means for shifting the separator means to release position when the actuating means is in non-engaging position, the springs and end plate being cooled by air streams induced by the rotation of the clutch and flowing through the pockets and radial channels.

6. A friction clutch comprising a hub having a back plate at one end thereof, a pair of floating plates having toothed engagement with the hub, a plurality of coacting plates alternately related to the back and floating plates, actuating means for engaging the plates, and means for releasing the clutch and providing separation of the floating plates including a plurality of studs circumferentially spaced around and having one end of each mounted in the back plate end of the hub, a rigid separator slidable only axially on each stud and having one end engageable with one of the floating plates and a radial ear at the opposite end engageable with the other floating plate, and a helical spring encircling each stud and interposed between the back plate and the associated separator for shifting the latter to release position when the actuating means is in non-engaging position.

7. A friction clutch comprising a hub having a back plate at one end thereof, a plurality of floating plates having toothed engagement with the hub including an end floating plate and two or more intermediate floating plates, a plurality of coacting plates alternately related to the back and floating plates, actuating means operable against the end floating plate for engaging all of the plates, and means for releasing the clutch and providing separation of the floating plates including a plurality of studs circumferentially spaced around and having one end of each mounted in the back plate end of the hub, a rigid separator slidable only axially on each stud and having one end engageable with the end floating plate and radial ears axially spaced therealong engageable with the respective intermediate floating plates, and a helical spring encircling each stud and interposed between the back plate and the associated separator for shifting the latter to release position when the actuating means is in non-engaging position.

References Cited in the file of this patent

UNITED STATES PATENTS

| | | |
|---|---|---|
| 913,370 | Freeman et al. | Feb. 23, 1909 |
| 2,324,613 | Criley | July 20, 1943 |
| 2,349,132 | Baird | May 16, 1944 |
| 2,354,604 | Newell | July 25, 1944 |
| 2,481,834 | Foster | Sept. 13, 1949 |
| 2,524,311 | Fieux | Oct. 3, 1950 |